(12) United States Patent
Forster et al.

(10) Patent No.: US 6,886,436 B2
(45) Date of Patent: May 3, 2005

(54) METHOD AND DEVICE FOR DAMPING A CHATTER OSCILLATION IN A PROCESSING MACHINE

(75) Inventors: Gerhard Forster, Schwarzenbruck (DE); Jens Hamann, Fürth (DE); Dietmar Stoiber, Fürth (DE)

(73) Assignee: Siemens Aktiengesellschaft, München (DE)

( * ) Notice: Subject to any disclaimer, the term of this patent is extended or adjusted under 35 U.S.C. 154(b) by 24 days.

(21) Appl. No.: 10/430,149

(22) Filed: May 6, 2003

(65) Prior Publication Data

US 2003/0209114 A1 Nov. 13, 2003

(30) Foreign Application Priority Data

May 10, 2002 (DE) .......................................... 102 20 937

(51) Int. Cl.[7] .................................................. B23B 3/00
(52) U.S. Cl. ............................ 82/1.11; 82/163; 82/118; 82/903
(58) Field of Search ......................... 82/1.11, 163, 118, 82/903, 904; 409/141; 408/145

(56) References Cited

U.S. PATENT DOCUMENTS

| | | | | |
|---|---|---|---|---|
| 3,744,435 A | * | 7/1973 | Rohs ............................ | 82/1.1 |
| 4,254,676 A | * | 3/1981 | Wilson .......................... | 82/34 |
| 4,759,243 A | * | 7/1988 | Thompson ..................... | 82/1.1 |
| 581,612 A | * | 10/1998 | Benning et al. ............... | 82/1.1 |
| 5,913,955 A | * | 6/1999 | Redmond et al. ............. | 82/1.1 |
| 5,957,016 A | * | 9/1999 | Segalman et al. ............ | 82/1.1 |

FOREIGN PATENT DOCUMENTS

DE 43 35 371 C2 7/1997

OTHER PUBLICATIONS

Publication "Hochgenaue Regelung von Linearmotoren durch optimierte Strommessung" (*High Precision Control Of Linear Motors Through Optimized Current Measurements*) published in the German technical journal "antriebstechnik", vol. 38 (1999), No. 9, pp. 90–93.

* cited by examiner

*Primary Examiner*—Willmon Fridie, Jr.
(74) *Attorney, Agent, or Firm*—Henry M. Feiereisen

(57) ABSTRACT

A device and a method are disclosed for attenuating a chatter oscillation in a processing machine, for example a cutting machine, such as a lathe. The machine includes at least one feed system with a primary section and a secondary section driven by a linear motor which can be powered via a converter. The device has a magnetic field control to control an in-phase component (d-component) of the magnetic field which produces the attractive force between of the primary section and the secondary section. An actual signal that is proportional to the chatter oscillation is generated and compared with a predetermined setpoint for a chatter oscillation. The comparison produces a control variable which is applied as a current setpoint to a field control that controls the current of the linear motor. This sufficiently attenuates chatter oscillations so that a reduction of the cutting depth is no longer required.

10 Claims, 3 Drawing Sheets

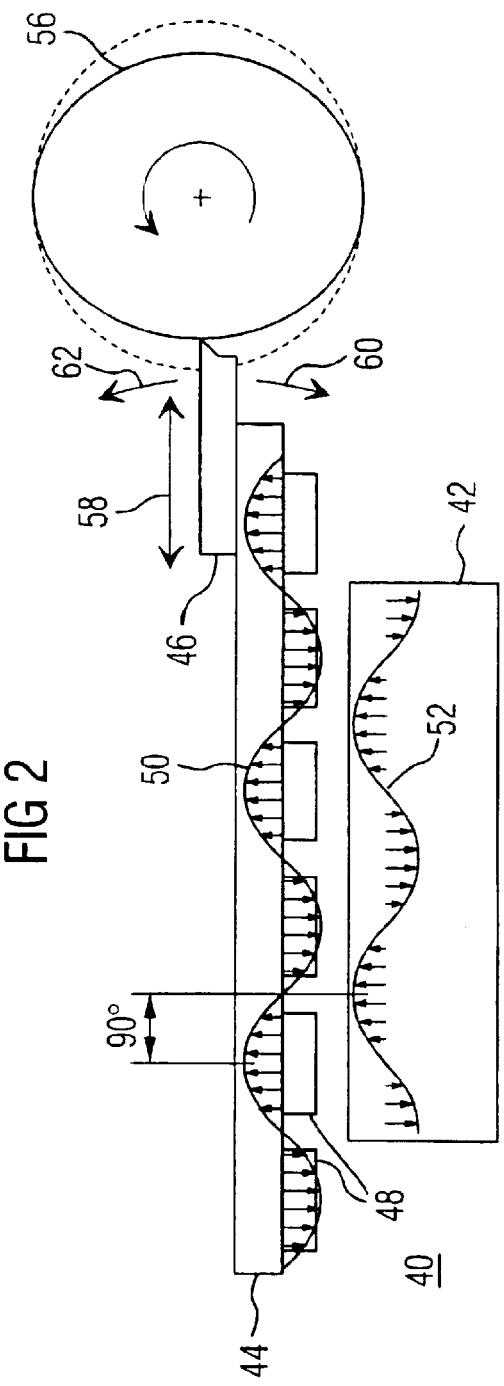
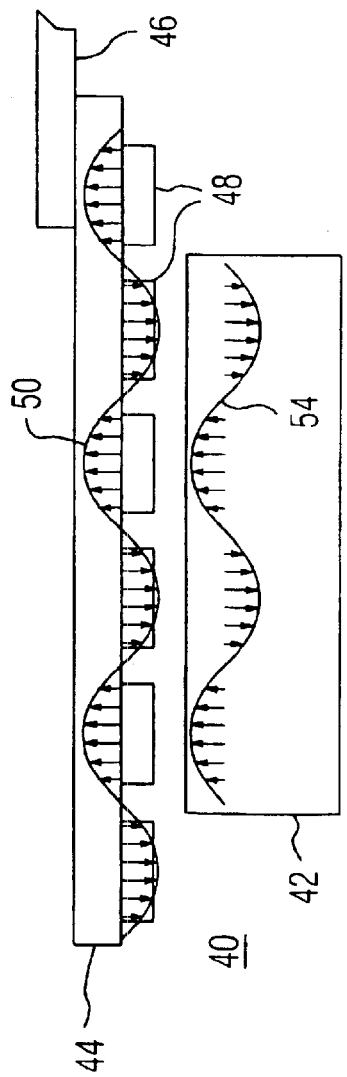

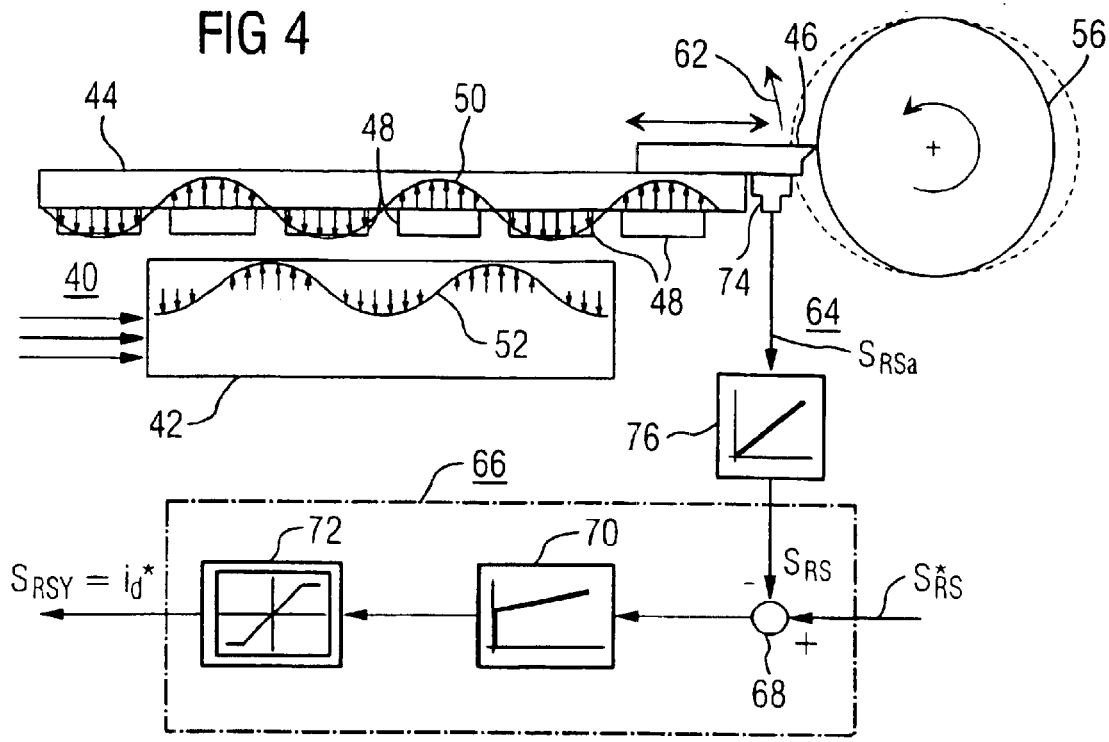
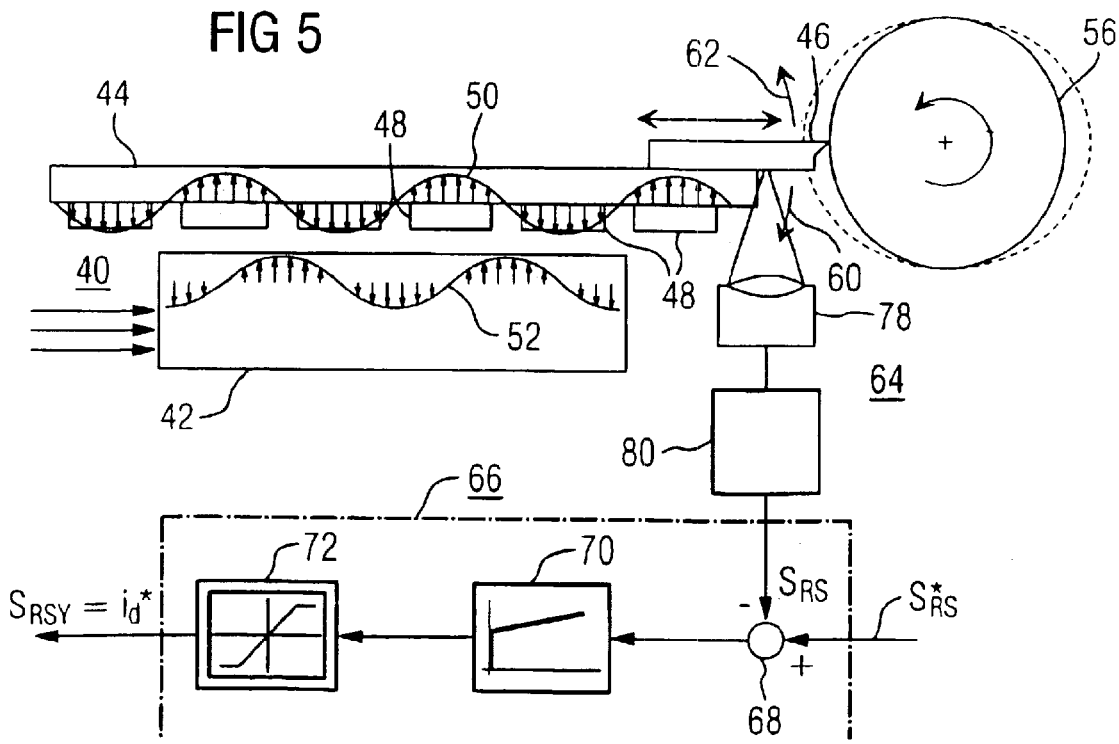

METHOD AND DEVICE FOR DAMPING A CHATTER OSCILLATION IN A PROCESSING MACHINE

CROSS-REFERENCES TO RELATED APPLICATIONS

This application claims the priority of German Patent Application, Ser. No. 102 20 937.5, filed May 10, 2002, pursuant to 35 U.S.C. 119(a)–(d), the disclosure of which is incorporated herein by reference.

BACKGROUND OF THE INVENTION

The present invention relates to a method for damping chatter oscillations in a processing machine, in particular a cutting machine, and to a device for carrying out the method.

Chatter oscillations in a workpiece or in a tool can occur when materials, particularly metals, are cut with a machine tool. Chatter can produce unusable surfaces and waste. Frequently, chatter occurs when the machine structure mechanically yields under the applied cutting forces. Periodic excursions are observed in particular when the cutting forces are excited at a frequency close to one of the characteristic resonance frequencies of the machine. These periodic excursions due to chatter can cause periodic discontinuities in the cutting force which under certain phase relationships with the machine resonances can sustain and/or even amplify chatter. The presence of chatter oscillations limits machine productivity, in particular when materials that require a high cutting force or a large cutting depth are cut. Chatter may only be reliably eliminated by reducing the cutting depth below a certain value.

If the desired cutting depth is to be maintained while eliminating chatter, the machine structure has to be either stiffened or better damped. Frequently, the available installation space and/or the weight or the costs of the machine make it difficult to implement a stiffer construction. Damping is difficult to improve by employing only mechanical means. The materials used in the construction of the machine have only very small and unpredictable intrinsic damping, in the order of a few percent.

The publication "Hochgenaue Regelung von Linearmotoren durch optimierte Strommessung" (*High Precision Control Of Linear Motors Through Optimized Current Measurements*) published in the German technical journal "antriebstechnik", Vol. 38 (1999), No. 9, pp 90–93, discloses a feed system with a permanent-excited synchronous linear motor and a field control with a high-resolution PWM transistor converter and a synchronized, high precision current measurement. A conventionally controlled linear motor with low friction guides exhibits under controlled operating conditions a parasitic motion which is superimposed on the feed motion. This parasitic motion is also observed when the motor is stopped. An adequate motion quality can be achieved by measuring the current with a secondary current controller while controlling the position. With a closed loop control, noise produces a corresponding feed force in the linear motor, which then causes a parasitic motion of the feed carriage. Only the parasitic components of the current along the q-axis (quadrature or out-of-phase axis), where the force is produced, cause a parasitic force and hence a parasitic motion. The parasitic components of the current along the d-axis (direct or in-phase axis), where the field is formed, do not affect the parasitic motion. Due to the high inertia of the carriage, high parasitic frequencies have only a small effect on the position of the carriage. The parasitic frequency curve has a maximum at intermediate frequencies, depending on the control bandwidth of the velocity and position control. This is the frequency range where disturbances in the current measurement have the greatest impact on the position of the carriage. A precise feed motion can be realized with a single drive system, which includes a synchronous linear motor, by synchronously measuring the currents, for example, by using an oversampling method with an effective resolution of 12 bits. This high-precision current measurement in conjunction with a field control improves the parasitic motion by a factor of 20, using the same control dynamics.

Unlike rotary servo motors, linear motors used for driving feed axes have a flat air gap. Linear motors have a (feed) direction along which the feed force is generated, and another (force) direction along which the attractive magnetic force is produced. The feed direction is parallel to the plane of the air gap, whereas the force direction is oriented normal to the plane of the air gap. Because the attractive force is perpendicular to the drive force, this force is also referred to as transverse force. In principle, the linear motor can produce controllable forces both in the feed direction and also in the transverse direction. For controlling the feed force, the q-component (quadrature or out-of-phase component) of the three-phase current is used, whereas the d-component (direct or in-phase component) is responsible for the attractive force. The two components are perpendicular in a three-phase system. Controlling the drive force via the q-component of the motor current does not affect the attractive force and vice versa. The two force directions are hence decoupled from each other. In conventional machine tools, only the direction of the feed force, i.e., the q-component is operational, because the machine carriage moves in the direction of the feed force. The attractive force is not controlled in conventional machine tools, so that the current of the d-component is always set to zero.

It would therefore be desirable and advantageous to provide an improved method and device for damping chatter oscillations in a machine tool, which obviates prior art shortcomings and is able to specifically operate with a linear motor controlled with a single field controller.

SUMMARY OF THE INVENTION

It has been observed that chatter oscillations that occur at a position of the linear motor produce an excursion in the direction of the attractive force. Such excursions can be damped with forces that are applied in the opposite direction of the attractive force. The forces in the direction of the attractive force are controlled by the so-called d-component of the motor current.

According to one aspect of the invention, a method for attenuating a chatter oscillation in a processing machine with at least one feed system which includes a linear motor controlled by a field controller, includes the steps of generating an actual signal that is proportional to the chatter oscillation; comparing the actual signal with a predetermined desired value for a chatter oscillation for determining a control variable; and applying the control variable as a desired current value of a secondary current control of the field controller for controlling a current of the linear motor.

Accordingly, a setpoint (also referred to as desired value) is generated for the d-component of the motor current as a function of the chatter oscillation. The occurring chatter oscillation is initially measured. This actual signal is regulated to a predetermined desired value for an occurring chatter oscillation, producing a control variable which is applied as a current setpoint for the d-component of the motor current to a secondary current controller for the d-axis of a field control of the linear motor. The linear motor thereby produces a transverse force which corresponds the excursion caused by the chatter oscillation and opposes the chatter oscillation.

According to another aspect of the invention, a device for attenuating a chatter oscillation in a processing machine with at least one feed system driven by a linear motor includes an acquisition system for generating an actual signal which is proportional to the chatter oscillation, a control circuit having a first input connected to an output of the acquisition system, and a second input receiving a predetermined desired value for the chatter oscillation, wherein the control circuit produces at an output of the control circuit a signal representing a d-component of a magnetic field in the linear motor; and a current control circuit connected to the output of the control circuit. The current control circuit produces, in response to the d-component, a field current in the linear motor that attenuates the chatter oscillation.

According to an advantageous feature of the invention, an acceleration value of the chatter oscillation can be measured and integrated to produce an actual velocity signal representing the chatter oscillation. Alternatively, a velocity of the chatter oscillation can be measured directly. Optimal results can be obtained when the predetermined desired value for a chatter oscillation is set to zero.

According to another advantageous feature of the invention, the controlled current applied to the stationary (movable) section has a phase relative to the magnetic field of the movable (stationary) section so as to produce an attractive force between a movable section and a stationary section of the feed system. The desired phase relationship can be easily implemented by supplying current to the linear motor via a converter.

Since the chatter oscillation is a mechanical oscillation, it can be measured either by measuring the velocity or the acceleration in the direction of the attractive force of the linear motor. According to an advantageous feature of the invention, an actual signal which is proportional to the chatter oscillation is generated by an acquisition system which can include a seismic acceleration sensor and an integrating circuit receiving a signal from the seismic acceleration sensor. A seismic sensor can be attached directly at the location where the chatter oscillation occurs and does not require a reference point. Alternatively or in addition, the acquisition system may include an optical sensor and an integrating circuit receiving a signal from the optical sensor. Other sensors capable of measuring a velocity or an acceleration can also be used.

The control circuit can include a comparator which compares the signals received from the acquisition system with a predetermined desired value for the chatter oscillation, a regulator connected to an output of the comparator, and a limiter connected to an output of the regulator, wherein the limiter produces the signal representing the d-component of the magnetic field in the linear motor.

With the process of the invention, any occurring chatter oscillation can be easily damped in a processing machine that has a feed system with a field-operated converter-fed linear motor.

The control circuit for controlling chatter oscillations can be integrated in the field control for the d-axis, for example as a software module that can be switched in and out. Accordingly, an acquisition system with at least one sensor has to be attached only at the location where the chatter oscillations are generated.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows a linear motor of a processing machine (not shown) with a magnetic field distribution and a primary field in the feed direction, FIG. 3 shows a linear motor with a magnetic field distribution and a primary field in the direction of the attractive force, FIG. 4 shows a first embodiment of a device for carrying out the method of the invention, and FIG. 5 shows a second embodiment of the device for carrying out the method of the invention.

DETAILED DESCRIPTION OF PREFERRED EMBODIMENTS

Figure 1:
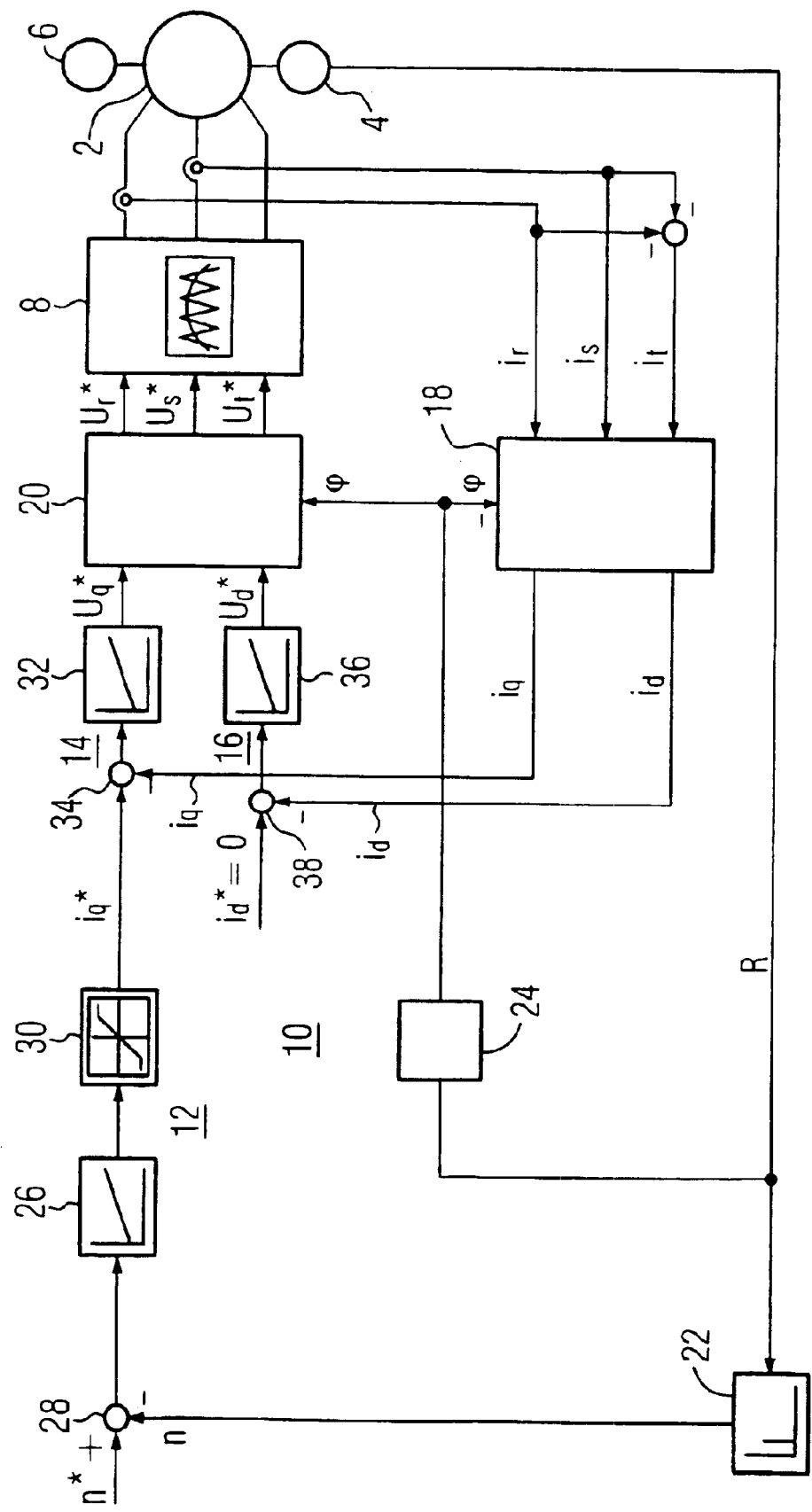
FIG. 1 shows a control structure of the conventional field control of a permanent-excited synchronous motor.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a permanent-excited synchronous motor 2, with a rotor position sensor 4, a brake 6, a converter 8, in particular an intermediate voltage converter, and a conventional field control 10. The stator of the permanent-excited synchronous motor is powered by the converter 8. The conventional field control 10 includes a rotation speed control circuit 12, two current control circuits 14, 16 as well as two conversion circuits 18 and 20. The field control 10 also includes a differentiating circuit 22 and a conversion device 24.

The rotation speed control circuit 12 includes a rotation speed controller 26, a comparator 28 and a limiter 30. A predetermined rotation speed setpoint n* is applied to the non-inverting input of the comparator 28, whereas a measured actual rotation speed value n is applied to the inverting input. The actual rotation speed value n is generated by the differentiating circuit 22 from the position signal R generated by the rotor position sensor 4. The output of the comparator 28 is connected to an input of the rotation speed controller 26, with the output of the rotation speed controller 26 being connected to the limiter 30. The output of the limiter 30 produces the setpoint signal $i^*_q$ of the secondary current control circuit 14.

The current control circuit 14 includes a comparator 34 and a current controller 32 connected to an output of the comparator 34. A second current control circuit 16 also includes a comparator 38 and current controller 36 connected to an output of the comparator 38. The outputs of the two current control circuits 14 and 16 are connected to corresponding inputs of a conversion circuit 20 which converts the two orthogonal setpoints $U^*_q$ and $U^*_d$ of the field voltage into three voltage setpoints $U^*_r$, $U^*_s$ and $U^*_t$ for the stator. The voltages $U^*_r$, $U^*_s$ and $U^*_t$ represent the voltage setpoints of the permanent-excited synchronous motor.

The stator currents $i_r$ and $i_s$ of the permanent-excited synchronous motor 2 are measured, and an input-side conversion circuit 18 converts the stator currents $i_r$ and $i_s$ into two orthogonal field current components $i_q$ and $i_d$ of a stator current space vector of the synchronous motor 2. The current components $i_q$ and $i_d$ are supplied to corresponding inverting inputs of the comparators 34 and 36 of the two current control circuits 14 and 16, as described above. The current component $i_q$, which is also referred to as a torque-forming current, is applied to the inverting input of the comparator 34. A setpoint of the current component $i_d$, which is also referred to as a flux-forming current component and has a value of zero, is applied to the non-inverting input of the comparator 38. Each of the two conversion circuits 18 and 20 requires information about the rotor position angle φ, which is generated by the conversion device 24 from the rotor position signal R of the rotor position sensor 4.

FIG. 2 shows a linear motor 40 of a feed system of a processing machine (not shown in detail). The motor 40 includes a primary section 42 and a secondary section 44. The secondary section 44 of the linear motor 40 is adapted to hold a tool 46, for example a cutting tool. The secondary section 44 of the linear motor 40 includes a plurality of permanent magnets 48 which are arranged side-by-side along the secondary section 44. The depicted magnetic field distribution 50 depends on the particular arrangement of the permanent magnets 48. A primary field with a q-component 52 and a d-component 54 (see FIG. 3) is produced in the primary section 42 of the linear motor 40.

FIG. 2 shows the q-component 52 of the primary field of the linear motor 40. The q-component 52 of the primary field is shifted by 90° elec. with respect to the magnetic field distribution of the permanent magnets 48 of the secondary section 44 of the linear motor 40. The d-component 54 of the primary field of the linear motor 40 is shown in more detail in FIG. 3. The d-component 54 of the primary field is in phase with the magnetic field distribution 50 of the permanent magnets 48. The q-component 52 of the primary field is produced when the linear motor 40 is energized in the feed direction. Conversely, the d-component 54 of the primary field is produced when the linear motor 40 is energized in the direction of the attractive force. The q- and d-components can be linearly combined and applied simultaneously. In conventional servo drives, only the q-component is used to move a secondary section relative to a primary section in a linear motor.

FIG. 2 also shows a workpiece 56 to be machined by an exemplary cutting tool 46. The workpiece is omitted from FIG. 3 for sake of clarity. A workpiece can be machined eccentrically by moving the secondary section 44 of the linear motor 40 back and forth in the feed direction. This motion is indicated by the double arrow 58. Machining the workpiece 56 in this way can generate chatter oscillations, as indicated by the arrows 60 and 62. Chatter can render the surfaces of the workpiece 56 unusable. Chatter is frequently caused when the machine structure mechanically yields to the cutting forces. Periodic excursions occur in particular, when the cutting force oscillations have a frequency in the range of a characteristic resonant frequency of the machine. The periodic machine excursions due to chatter can also produce periodic discontinuities in the cutting force which can have a phase relationship to the machine resonances that sustain and/or even amplify chatter. In particular, with materials requiring a large cutting force or a large cutting depth, the onset of chatter oscillations can reduce or limit the machine productivity. The cutting depth may therefore have to be reduced so as to reliably eliminate chatter.

FIG. 4 depicts a linear motor 40 of a feed system of a processing machine (not shown in detail) according to FIG. 2 coupled to a device for carrying out the method of the invention. The device includes an acquisition system 64 that generates an actual signal $S_{RS}$ which is proportional to the chatter oscillation, and a control circuit 66. The control circuit 66 is electrically connected to an output of the acquisition system 64. In its simplest embodiment, the control circuit 66 includes a comparator 68, a controller 70, in particular a PI-controller, and a limiter 72. A setpoint signal $S^*_{RS}$ for the chatter oscillation is applied to the non-inverting input of the comparator 68. The measured actual signal $S_{RS}$ of an occurring chatter oscillation is applied to the input of the acquisition system 64, with the output of the acquisition system 64 being connected to the inverting input of the comparator 68 of the control circuit 66. The output of the comparator 68 is connected to the input of the controller 70, and the limiter 72 is connected to the output of the controller 70. The output of the limiter 72 produces a control variable $S_{RSY}$ which is supplied as a setpoint signal $i^*_d$ to the current control circuit 16 for the d-component of the field control 10 depicted in FIG. 1. The control variable $S_{RSY}$ is indicative of a correction that has to be applied to the actual signal $S_{RS}$ of an occurring chatter oscillation, such that the setpoint signal $S^*_{RS}$ for the chatter oscillation has a predetermined value. The value for the setpoint signal $S^*_{RS}$ is set to zero, since any chatter oscillation present can render surfaces of the workpiece 56 unusable.

In the embodiment illustrated in FIG. 4, the acquisition system 64 that generates an actual signal $S_{RS}$ proportional to the occurring chatter oscillation includes a seismic acceleration sensor 74 and an integrating circuit 76. The exemplary seismic acceleration sensor 74 is a piezo sensor which does not require a reference point. As a result, the seismic acceleration sensor 74 can be placed directly on the tool 46. The output signal $S_{RSa}$ of the seismic acceleration sensor 74 is the acceleration a of an occurring chatter oscillation in the direction of the attractive force of the linear motor 40. The integrating circuit 76 generates from the determined output signal $S_{RSa}$ a corresponding velocity signal which is supplied as the actual signal $S_{RS}$ to the inverting input of the comparator 68 of the control circuit 66.

The actual velocity signal $S_{RS}$ and a predetermined velocity signal setpoint $S^*_{RS}$ can be used to generate a setpoint $S_{RSY}$, which is supplied as a current setpoint $i^*_d$ to the secondary current control circuit 16 for the d-component of the motor current of the field controller 10. The secondary current control circuit 16 for the d-component regulates the attractive force in the linear motor 40 so as to counteract the velocity of the occurring chatter oscillation. In this way, the velocity of the chatter oscillation is controlled to the predetermined value of the setpoint signal $S^*_{RS}$.

FIG. 5 shows a second embodiment of the device for carrying out the method for damping an occurring chatter oscillation in a processing machine with at least one feed system. This embodiment is different from the embodiment of FIG. 4 in that the acquisition system 60 includes an optical sensor 78 and a signal processor 80. The optical sensor 78 is used to measure the velocity of the occurring chatter oscillation in the direction of the attractive force of the motor. The output signal of the optical sensor 78 is supplied to the signal processor 80 which generates an actual signal $S_{RS}$ which is proportional to the chatter oscillation.

The method of the invention can be used when chatter oscillations that have a component in the direction of the attractive force extend into the air gap space of the linear motor 40. The method of the invention does not depend on the particulars by which a chatter oscillation is detected or measured. The method of the invention advantageously uses the previously unused d-component of the field controller 10 to dampen chatter oscillations. The method of the invention can advantageously be implemented with a single acquisition system 64 and a single control circuit 66. The control circuit 66 can subsequently be integrated with other field controllers, for example, as a software module. The software module can also be activated on demand, so that the method of the invention operates only in the presence of chatter oscillations. The acquisition system 64 depicted in FIG. 4 operates with a piezo sensor which does not require a reference point and can therefore determine the velocity of an occurring chatter oscillation. Moreover, the seismic acceleration sensor 74 is small enough to be placed in close proximity to a location where a chatter oscillation is generated.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method for attenuating a chatter oscillation in a processing machine with at least one feed system which includes a linear motor controlled by a field controller, comprising the steps of:

generating an actual signal that is proportional to the chatter oscillation;

comparing the actual signal with a predetermined desired value for a chatter oscillation for determining a control variable; and applying the control variable as a component of a desired current value of a secondary current control of the field controller, the component being in phase with a magnetic field distribution of permanent magnets of the linear motor, for controlling a current of the linear motor to counteract the chatter oscillation.

2. The method of claim 1, and further comprising the steps of measuring an acceleration value of the chatter oscillation and integrating the acceleration value to produce an actual velocity signal.

3. The method of claim 1, and further comprising the step of measuring a velocity of the chatter oscillation.

4. The method of claim 1, wherein the predetermined desired value for a chatter oscillation is set to zero.

5. The method of claim 1, wherein a supply current of the linear motor is provided by a converter.

6. A method for attenuating a chatter oscillation in a processing machine with at least one feed system which includes a linear motor controlled by a field controller, comprising the steps of:

generating an actual signal that is proportional to the chatter oscillation;

comparing the actual signal with a predetermined desired value for a chatter oscillation for determining a control variable; and applying the control variable as a desired current value of a secondary current control of the field controller for controlling a current of the linear motor, wherein the controlled current has a phase so as to produce an attractive force between a movable section and a stationary section of the feed system.

7. A device for attenuating a chatter oscillation in a processing machine with at feast one feed system driven by a linear motor having a primary section and a secondary section, the secondary section comprising permanent magnets, the device comprising:

an acquisition system for generating an actual signal which is proportional to the chatter oscillation, a control circuit having a first input connected to an output of the acquisition system, and a second input receiving a predetermined desired value for the chatter oscillation, said control circuit producing at an output of the control circuit a signal representing a d-component of a magnetic field in the primary section of the linear motor, said d-component being in phase with a magnetic field distribution of the permanent magnets of the secondary section; and a current control circuit connected to the output of the control circuit and producing, in response to the d-component, a field current in the primary section of the linear motor that attenuates the chatter oscillation.

8. The device of claim 7, wherein the acquisition system includes a seismic acceleration sensor and an integrating circuit receiving a signal from the seismic acceleration sensor and producing the actual signal.

9. The device of claim 7, wherein the acquisition system includes an optical sensor and an Integrating circuit receiving a signal from the optical sensor and producing the actual signal.

10. The device of claim 7, wherein the control circuit includes a comparator which compares signals received from the acquisition system with a predetermined desired value for the chatter oscillation, a regulator connected to an output of the comparator, and a limiter connected to an output of the regulator, said limiter producing the signal representing the d-component of the magnetic field in the linear motor.

\* \* \* \* \*